United States Patent
Elend et al.

(10) Patent No.: US 10,013,379 B2
(45) Date of Patent: Jul. 3, 2018

(54) AUTO-ADDRESSING OF COMMUNICATION NODES

(71) Applicant: NXP B.V., Eindhoven (NL)

(72) Inventors: Bernd Uwe Gerhard Elend, Hamburg (DE); Rainer Evers, Hamburg (DE)

(73) Assignee: NXP B.V., Eindhoven (NL)

(*) Notice: Subject to any disclaimer, the term of this patent is extended or adjusted under 35 U.S.C. 154(b) by 143 days.

(21) Appl. No.: 15/048,354

(22) Filed: Feb. 19, 2016

(65) Prior Publication Data
US 2017/0242816 A1    Aug. 24, 2017

(51) Int. Cl.
| | | |
|---|---|---|
| G06F 13/00 | (2006.01) | |
| G06F 13/40 | (2006.01) | |
| H04L 29/12 | (2006.01) | |
| G06F 13/42 | (2006.01) | |
| G06F 13/364 | (2006.01) | |
| G06F 13/22 | (2006.01) | |

(52) U.S. Cl.
CPC .......... G06F 13/404 (2013.01); G06F 13/22 (2013.01); G06F 13/364 (2013.01); G06F 13/4282 (2013.01); H04L 61/20 (2013.01)

(58) Field of Classification Search
CPC ............................. H04L 61/20; G06F 13/404
See application file for complete search history.

(56) References Cited

U.S. PATENT DOCUMENTS

| | | | | |
|---|---|---|---|---|
| 2007/0213879 A1* | 9/2007 | Iwamura | ................. | H04B 3/54 700/292 |
| 2011/0140533 A1* | 6/2011 | Zeng | ................. | B60L 11/1853 307/80 |
| 2013/0057339 A1* | 3/2013 | Koudar | ................. | G06F 13/4252 327/565 |
| 2014/0095749 A1 | 4/2014 | Lambrechts | | |
| 2015/0180677 A1* | 6/2015 | Logvinov | ........... | H04L 12/1886 370/390 |

FOREIGN PATENT DOCUMENTS

| | | |
|---|---|---|
| EP | 1 603 282 A1 | 12/2005 |
| EP | 2 154 831 A1 | 2/2010 |

OTHER PUBLICATIONS

Maxim Integrated "MAX9621, Dual, 2-Wire Hall-Effect Sensor Interface with Analog and Digital Outputs Provides Flexibility and Saves Cost in Automotive Applications", 2 pgs., retrieved from the Internet Feb. 16, 2016 at: https://www.maximintegrated.com/en/products/analog/sensors-and-sensor-interface/MAX9621.html (2016).

* cited by examiner

*Primary Examiner* — Zachary K Huson
(74) *Attorney, Agent, or Firm* — Rajeev Madnawat

(57) ABSTRACT

A system for assigning addresses to a plurality of communication nodes coupled via a power line is disclosed. Each of the plurality of communication nodes includes a current sensor. The plurality of communication nodes includes one master communication node and the master communication node is configured to start an auto-addressing process by asking the each of the plurality of communication nodes to sink a preselect amount of current and measure current, through the current sensor, flowing through the powerline under the each of the plurality of communication nodes. A first communication node in the plurality of communication nodes that does not measure any current flowing under the first communication node is assigned a first address.

13 Claims, 2 Drawing Sheets

AUTO-ADDRESSING OF COMMUNICATION NODES

BACKGROUND

In many systems in which different subsystems are controlled and operated by different computing units (e.g., nodes), the nodes are connected via a bus system. For example, in an automobile, various electronic control units (ECU) are connected via a bus. Each of these ECUs may be configured to perform different operations. These nodes communicate with each other using communication protocols. Power line communication (PLC) is one technique that enables different nodes to communicate using power lines so that there is no need for a separate communication line.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for assigning addresses to a plurality of communication nodes coupled via a power line is disclosed. Each of the plurality of communication nodes includes a current sensor. The plurality of communication nodes includes one master communication node and the master communication node is configured to start an auto-addressing process by asking the each of the plurality of communication nodes to sink a preselect amount of current and measure current, through the current sensor, flowing through the powerline under the each of the plurality of communication nodes. A first communication node in the plurality of communication nodes that does not measure any current flowing under the first communication node is assigned a first address.

In some embodiments, the master communication node is further configured to ask the first communication node not to sink any current while asking all other nodes to sink the preselected amount of current and measure current flowing under each of the plurality of communication nodes. A communication node that does not measure any current flowing under the communication node is assigned a second address.

The master communication node is further configured to ask all communication nodes with assigned addresses in the plurality of communication nodes not to sink any current while asking all other communication nodes in the plurality of communication nodes to sink a preselected amount of current. An address is assigned to one communication node that does not measure any current flowing under the one communication node. After addresses are assigned to all communication nodes in the plurality of communication nodes, each node in the plurality of communication nodes is configured to announce operations performed by the each node.

Each of the plurality of communication nodes is configured to sink a preselected amount of current using a circuit that includes a resistive load and by applying a voltage derived based on the preselected amount of current.

Each of the plurality of communication nodes includes a memory for storing programming instructions that are configured to interpret commands from the master communication node. The memory further includes programming instructions for directing a circuit to sink the preselect amount of current. The memory may also include programming instructions for directing a circuit to receive input from the current sensor. The memory may further include programming instructions to assign an address to the each of the plurality of communication nodes when the current sensor measures no current flow or measures current below a preselected threshold. The memory further includes storage for storing the first address.

In another embodiment, a communication device is disclosed. The communication device includes a processor, a memory, a current sink circuit having a preselected resistance, a powerline coupling circuit to couple the communication device to a powerline and a current measurement circuit. The processor is configured to receive a command from an external device to sink a preselect amount of current through the current sink circuit and measure current flowing through the powerline. The processor is further configured to assign an address if a current below or equal to a preselected threshold is measured by the current measurement circuit. The communication device further includes a powerline communication module coupled to the powerline coupling circuit. The powerline communication module may be implemented in software and may reside in the memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
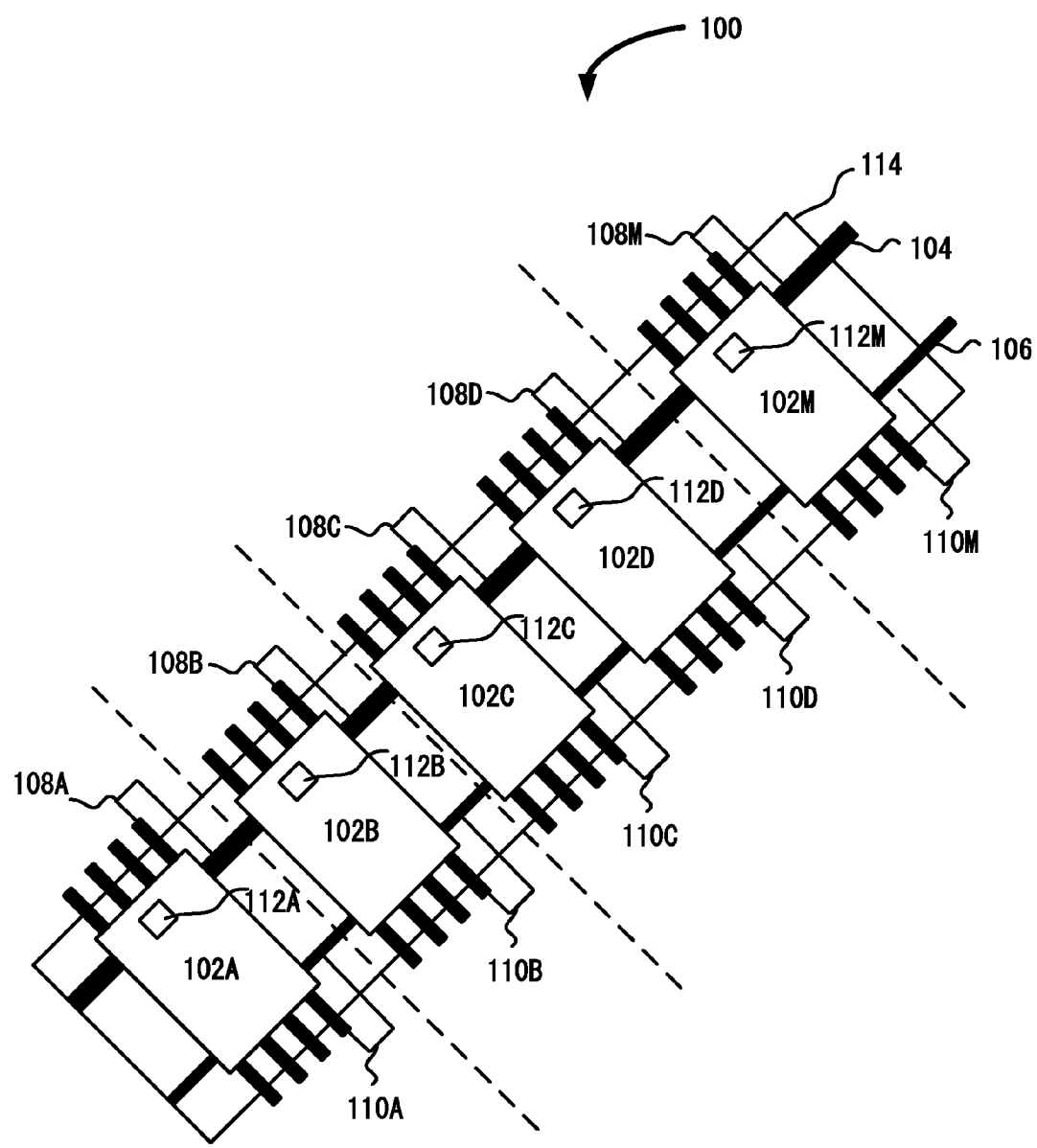
FIG. 1 is a symbolic representation of a system including a plurality of nodes connected with each other in accordance with one or more embodiments of the present disclosure.

FIG. 1 illustrates a symbolic representation of a system including a plurality of nodes connected with each other 100. The system 100 includes a printed circuit board (PCB) 114 upon which a supply line 104 and a ground line 106 are laid. Over the supply line 104 and ground line 106, communication nodes 102A . . . 102M are mounted. Note that all communication nodes are being shown on a single PCB 114 merely for the ease of drawing and description. The dotted lines across the PCB 114 signify that some or all communication nodes 102A . . . 102M may be on separate printed circuit boards or mountings. Between the communication nodes 102A . . . 102M and the power supply line 104, Hall sensors 112A . . . 112M are mounted. Powerline communication (PLC) is a communication protocol that uses electrical wiring to simultaneously carry both data and power. PLC is well known in art, hence its detailed discussion is being omitted so as not to obfuscate the system and method of auto-addressing described herein. Each of the communication nodes 102A . . . 102M are connected to the power supply line 104 via supply links 108A . . . 108M. Similarly, each of the communication nodes 102A . . . 102M are connected to ground via ground links 110A . . . 110M. It should be noted that the number of communication nodes depicted in FIG. 1 are merely for illustration. In some embodiments, The Hall sensors 112A . . . 112M may be fabricated within the communication nodes 102A . . . 102M. In other embodiments, the Hall sensors 112A . . . 112M may be external to the communication nodes 102A . . . 102M and each coupled to a respective communication node through an integrated circuit (IC) pin such that the Hall sensors 112A . . . 112M can provide measurement inputs to respective communication nodes. In some embodiments, the link (e.g., 108C) must reside prior to the Hall sensor (e.g., 112C) when looking from the source of the supply line 104.

Note that a specific structure of the system 100 is being shown for the ease of description only. A person skilled in the art would realize that the embodiments described herein can be used for automatically assigning node addresses to communication nodes when the communication nodes need to communicate on a communication bus. Further, even when direct current (DC) power supply line is being used in this description, in some embodiments, the system and methods described herein may also be used when the power supply line carries alternating current (AC). Still further, in some embodiments, the auto addressing methods described herein may also be used when the communication is being carried on a communication line that is separate from the power supply line.

Typically, on a communication network, each communication node must have a unique address to uniquely identify itself. Without a unique address assigned to each communication node on a communication network, a communication among the communication nodes will not be possible, at least using standard communication protocols. Therefore, typically, a unique address is pre-assigned permanently to a communication node at the time of manufacturing or during provisioning of the communication node. In some applications, dip switches are used for providing addresses to communication nodes. However, both these methods require additional efforts to provision one or more communication nodes on a communication network. Dip switch technique is even more problematic because the number of communication nodes on a communication network would be limited to the capacity of the dip switch. Further, a manual efforts are required to place switches in the dip switch in correct positions. The embodiments described herein provides auto-addressing of communication nodes so that no dip switches or pre-configured addresses for communication nodes are needed.

Going back to FIG. 1. A Hall sensor is a transducer that varies its output voltage in response to a magnetic field. Hall sensors are used for proximity switching, positioning, speed detection, and current sensing applications. In its simplest form, the sensor operates as an analog transducer, directly returning a voltage. Since flowing current produces magnetic field that is proportional to the amount of current flowing through a wire, a Hall sensor may be used for measuring current in the wire. As depicted in FIG. 1, Hall sensors 112A . . . 112M are being used between each of the communication nodes 108A . . . 108M and the power supply line 104. The Hall sensors 112A . . . 112M provides voltage measurements to their respective communication nodes 102A . . . 102M.

Figure 2:
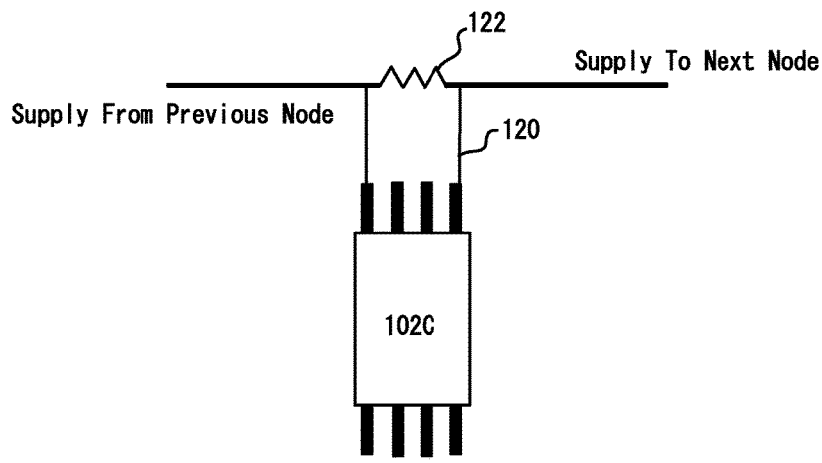
FIG. 2 illustrates the use of a shunt resistor in power line in accordance to one of more embodiments of the present disclosure.

Briefly going to FIG. 2 that shows a use of a shunt resistor 122 and a coupling 120 of the power supply line 104 with the communication node 102C. Note that the communication node 102C is being used merely for illustration here to describe the use of the shunt resistor 122. In some embodiments in which the use of Hall sensors may not be appropriate (e.g., current level is below the threshold a Hall sensor can provide a reliable voltage reading), a shunt resistor 122 may be used to measure voltage drop caused by the communication node 102C.

Figure 3:
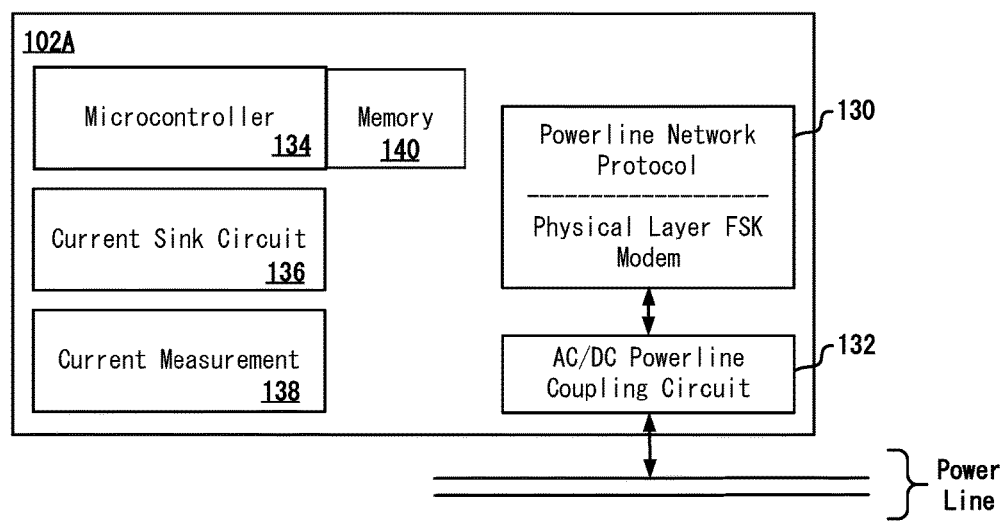
FIG. 3 illustrates a schematic a communication device including a power line communication sub-system in accordance to one of more embodiments of the present disclosure.

Going to FIG. 3 briefly. FIG. 3 illustrates a schematic of the communication node 102A including a power line communication sub-system. Other communication nodes will also have a same or similar structure. The power line communication sub-system is embedded in each of the communication nodes 102A . . . 102M to enable each of the communication nodes 102A . . . 102M to use the power line (e.g., the power supply line 104 and the ground line 106) for communication. As shown, the sub-system includes a communication module 130 that provides a powerline network protocol layer and a physical layer. The sub-system also includes an AC/DC powerline coupling circuit 132 to couple the communication nodes 102A . . . 102M to the power line. It should be noted that a different sub-system can be used for using a communication line that is separate from the supply line. The basic component block of the sub-system will remain the same (or similar) in that instead of the powerline network protocol layer, a protocol layer suitable for the communication protocol being used will be used. Similarly, the coupling circuit 132 will be replaced by an isolation circuit suitable for the communication line. The coupling circuit 132 is coupled to the power supply line 104 via the link 108A and to the ground line 106 via the link 110A (in the communication node 102A, for example) so that the same links 108A a 110A can be used both for powering the communication node 102A and providing a channel for communication. The microcontroller 134 is also configured to assign an address to the communication node 102A based on the auto-addressing step sequence and based on the current measurement.

The communication node 102A also includes a microcontroller or a processor 134 and a memory 140 for storing programming instructions and node address. The microcontroller 134 is configured to receive instructions from an external communication node to sink a preselect amount of current and to measure the current flowing through it or flowing under it through a current measurement circuit 138. The current measurement circuit 138 may be coupled to the Hall sensor 112A or to a shunt resistor. The communication node 102A further includes a current sink circuit 136 to sink a preselect amount of current based on directions from the microcontroller 134.

Going to back to FIG. 1. Each of the communication nodes 102A . . . 102M includes a processing circuit which could be a microcontroller including a memory. The memory includes programming instructions to perform an operation as described below.

In the example illustrated in FIG. 1, the communication node 102M is a master node. The master communication node 102M must be at one end of the daisy chain network. The master node 102M initiates the auto-addressing process. The master communication node 102M sends a broadcast message to all communication nodes 102A . . . 102D using a predefined protocol format (e.g., the powerline communication protocol). All communication nodes 102A . . . 102D include programming instructions to receive and understand auto-addressing commands from the master communication node 102M. At first, the master communication node 102M asks each of the communication nodes 102A . . . 102D to sink a preselect amount (e.g., 100 mA current). Note that this command may also be executed by the master communication node 102M itself. In the first iteration, the communication node 102A fails to measure any current flowing to the next communication node because the communication node 102A is at the end of the daisy chain. Since in the entire daisy chain, the communication node 102A is the only node that could not measure any current flow (or current flow below a preselected threshold value) through it (measured by either the Hall sensor 112A or by a shunt resistor in an alternate embodiment), the communication node 102A is assigned an address, let's say 1 (for the ease of description). The address assignment can be done by the communication node 102A itself because each of the communication nodes 102A . . . 102M may count the iteration sequence of sinking current commands. In another embodiment, the master communication node 102M counts the iteration sequence number and sends a command such as "The node that does not measure any current will take the address <iteration sequence number>". Now that the communication node 102A has an assigned address, the communication node 102A can receive commands that are specifically addressed to it. The assigned address is stored in a memory in the communication node 102A.

In the next iteration, the master communication node 102M asks Node Address 1 (e.g., the communication node 102A) not to sink any current and asks all other nodes to sink a preselected amount of current. Since the communication node 102A did not sink any current, the communication node 102B could not measure any current flowing through it. Since this is a second iteration, the communication node 102B is assigned address 2. Iteration continues until the master communication node 102M does not measure any current through its current measuring device, e.g., the Hall sensor 112M. In some embodiments, the master communication node 102M repeats the process for a predefined maximum number of times equal to the maximum number of communication nodes allowed or expected to be present in the system 100. The master communication node 102M may also end the iterative process, as described above, when no response is received from communication nodes with respect to the address assignment.

Each of the communication nodes 102A . . . 102M includes circuitry that is configured to sink a preselected amount of current upon a request from the master communication node 102M. In some embodiments, the circuitry may include a resistive load or complex load of preselected resistance (R). Each of the communication nodes 102A . . . 102M may apply a selected voltage to the load to sink a preselected amount of current. In some embodiments, the applied voltage can be derived using the formula V=I/R.

Once all communication nodes, which may also include the master communication node 102M are assigned unique addresses, all communication nodes 102A . . . 102M may communicate with each other. In some embodiments, after all communication nodes are assigned addresses, each of them may send a broadcast (or a directed message to the master communication node 102M) announcing their addresses and the operations they perform. For example, the communication node 102A may announce "Address: 1, Operation: Interior Light Control." In these embodiments, for example, if the master communication node 102M receives a request from an external system to dim interior lights, the master communication node 102M can route that command through the preselected communication protocol to the communication node 102A.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function).

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that several of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for assigning addresses to a plurality of communication nodes coupled via a powerline underlying each communication node, each of the plurality of communication nodes includes a current sensor, the plurality of communication nodes includes one master communication node, the master communication node is configured to start an auto-addressing process by asking, via the powerline, the each of the plurality of communication nodes to sink a preselect amount of current and measure current, with the current sensor, flowing through the powerline, wherein a first communication node in the plurality of communication nodes that does not measure any current flowing under the first communication node is assigned a first address.

2. The system of claim 1, wherein the master communication node is further configured to ask the first communication node not to sink any current while asking all other nodes to sink the preselected amount of current and measure current flowing under each of the plurality of communication nodes, wherein a communication node that does not measure any current flowing under the communication node is assigned a second address.

3. The system of claim 2, wherein the master communication node is further configured to ask all communication nodes with assigned addresses in the plurality of communication nodes not to sink any current while asking all other communication nodes in the plurality of communication nodes to sink a preselected amount of current, wherein an address is assigned to one communication node that does not measure any current flowing under the one communication node.

4. The system of claim 3, wherein after addresses are assigned to all communication nodes in the plurality of communication nodes, each node in the plurality of communication nodes is configured to announce operations performed by the each node.

5. The system of claim 1, wherein the each of the plurality of communication nodes is configured to sink a preselected amount of current using a circuit that includes a resistive load and by applying a voltage derived based on the preselected amount of current.

6. The system of claim 1, wherein the each of the plurality of communication nodes includes a memory for storing programming instructions that are configured to interpret commands from the master communication node.

7. The system of claim 6, wherein the memory further includes programming instructions for directing a circuit to sink the preselect amount of current.

8. The system of claim 6, wherein the memory further includes programming instructions for directing a circuit to receive input from the current sensor.

9. The system of claim 8, wherein the memory further includes programming instructions to assign an address to the each of the plurality of communication nodes when the current sensor measures no current flow or measures current below a preselected threshold.

10. The system of claim 6, wherein the memory further includes storage for storing the first address.

11. A communication device, comprising:
a processor;
a memory;
a current sink circuit having a preselected resistance;
a powerline coupling circuit to couple the communication device to a powerline underlying the communication device; and
a current measurement circuit,
wherein the processor is configured to receive a command, via the powerline, from an external device to sink a preselect amount of current through the current sink circuit and measure current flowing through the powerline,
wherein the processor is further configured to assign an address if a current below or equal to a preselected threshold is measured by the current measurement circuit.

12. The communication device of claim 11, further including a powerline communication module coupled to the powerline coupling circuit.

13. The communication device of claim 12, wherein the powerline communication module is implemented in software and reside in the memory.

* * * * *